United States Patent
Weissig et al.

(10) Patent No.: US 10,708,471 B2
(45) Date of Patent: Jul. 7, 2020

(54) ALIGNMENT OF A CAMERA SYSTEM, CAMERA SYSTEM AND ALIGNMENT AID

(71) Applicant: Fraunhofer-Gesellschaft zur Foerderung der angewandten Forschung e.V., Munich (DE)

(72) Inventors: Christian Weissig, Berlin (DE); Arne Finn, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 36 days.

(21) Appl. No.: 14/885,772

(22) Filed: Oct. 16, 2015

(65) Prior Publication Data
US 2016/0037030 A1    Feb. 4, 2016

Related U.S. Application Data

(63) Continuation of application No. PCT/EP2013/057921, filed on Apr. 16, 2013.

(51) Int. Cl.
| | |
|---|---|
| H04N 5/225 | (2006.01) |
| H04N 5/247 | (2006.01) |
| G02B 26/08 | (2006.01) |
| H04N 5/232 | (2006.01) |
| G03B 37/04 | (2006.01) |
| G03B 17/56 | (2006.01) |
| G03B 43/00 | (2006.01) |
| G03B 35/08 | (2006.01) |

(52) U.S. Cl.
CPC ....... H04N 5/2252 (2013.01); G02B 26/0816 (2013.01); G03B 17/561 (2013.01); G03B 37/04 (2013.01); G03B 43/00 (2013.01); H04N 5/2251 (2013.01); H04N 5/2258 (2013.01); H04N 5/23238 (2013.01); H04N 5/247 (2013.01); G03B 35/08 (2013.01)

(58) Field of Classification Search
CPC ............... H04N 5/2252; H04N 5/2258; H04N 5/23238; H04N 5/2251; H04N 5/247; G02B 26/0816; G03B 17/561; G03B 37/04; G03B 43/00; G03B 35/08
See application file for complete search history.

(56) References Cited

U.S. PATENT DOCUMENTS

| | | | |
|---|---|---|---|
| 5,539,483 | A | 7/1996 | Nalwa |
| 5,745,305 | A | 4/1998 | Nalwa |
(Continued)

FOREIGN PATENT DOCUMENTS

| | | |
|---|---|---|
| CN | 101534371 A | 9/2009 |
| CN | 201886262 U | 6/2011 |
(Continued)

*Primary Examiner* — Luong T Nguyen
(74) *Attorney, Agent, or Firm* — Perkins Coie LLP; Michael A. Glenn

(57) ABSTRACT

The alignment of a camera system is less expensive when using a holder with a plurality of connecting pieces, each implemented for connecting, fitting or clamping with a counterpart of a camera housing or an objective, a holder that is implemented such that the connecting pieces or holder modules of the holder, where the connecting pieces are held rigidly or merely at rotation axes, are held rigidly with respect to one another along at least one common spatial direction.

28 Claims, 20 Drawing Sheets

(56) References Cited

U.S. PATENT DOCUMENTS

| | | |
|---|---|---|
| 5,793,527 A | 8/1998 | Nalwa et al. |
| 5,990,934 A | 11/1999 | Nalwa |
| 6,111,702 A | 8/2000 | Nalwa |
| 6,115,176 A | 9/2000 | Nalwa |
| 6,128,143 A | 10/2000 | Nalwa |
| 6,141,145 A | 10/2000 | Nalwa |
| 6,144,501 A | 11/2000 | Nalwa et al. |
| 6,195,204 B1 | 2/2001 | Nalwa et al. |
| 6,219,090 B1 | 4/2001 | Nalwa et al. |
| 6,285,365 B1 | 9/2001 | Nalwa et al. |
| 6,356,397 B1 | 3/2002 | Nalwa et al. |
| 6,560,413 B1 * | 5/2003 | Lee .................. G03B 17/17 348/36 |
| 6,683,654 B1 * | 1/2004 | Haijima ............... H04N 5/2252 348/335 |
| 6,700,711 B2 | 3/2004 | Nalwa et al. |
| 2005/0117015 A1 * | 6/2005 | Cutler .................. H04N 5/2254 348/38 |
| 2006/0023106 A1 * | 2/2006 | Yee .................... G02B 27/2228 348/335 |
| 2006/0042064 A1 * | 3/2006 | Montfort .............. H04N 5/2253 29/407.1 |
| 2007/0188623 A1 | 8/2007 | Yamashita et al. |
| 2010/0045773 A1 * | 2/2010 | Ritchey .................. G02B 13/06 348/36 |
| 2012/0249867 A1 * | 10/2012 | Sakoda ................ H04N 5/2252 348/374 |
| 2013/0016181 A1 | 1/2013 | Penner et al. |
| 2013/0076931 A1 * | 3/2013 | Border ............... G02B 27/0075 348/222.1 |

FOREIGN PATENT DOCUMENTS

| | | |
|---|---|---|
| JP | 2004145680 A | 5/2004 |
| WO | 2012136388 A1 | 10/2012 |

* cited by examiner

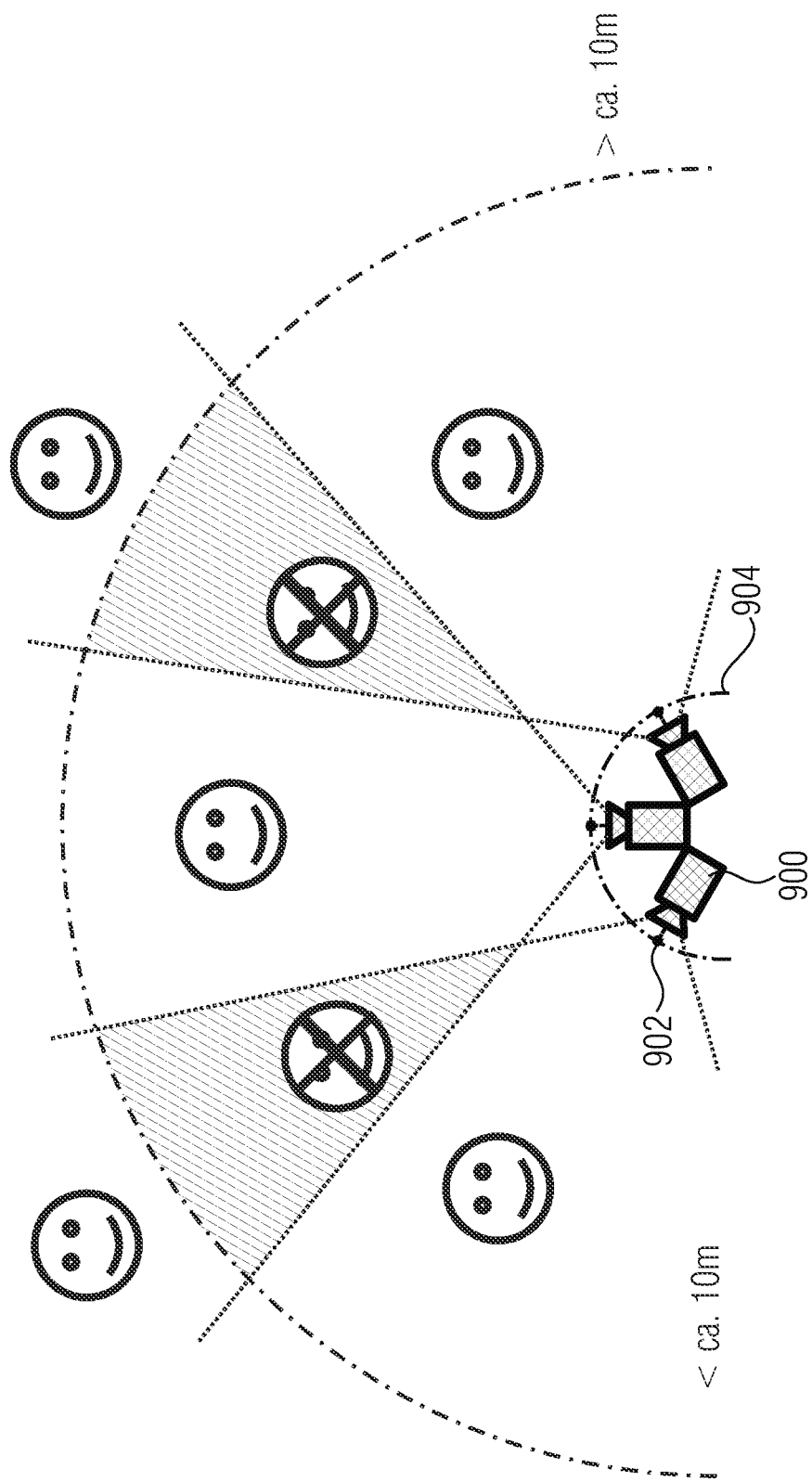

ALIGNMENT OF A CAMERA SYSTEM, CAMERA SYSTEM AND ALIGNMENT AID

CROSS-REFERENCE TO RELATED APPLICATIONS

This application is a continuation of copending International Application No. PCT/EP2013/057921, filed Apr. 16, 2013, which is incorporated herein by reference in its entirety.

BACKGROUND OF THE INVENTION

The present invention relates to the alignment of camera systems, camera systems as well as an alignment aid for the alignment of camera systems.

Initially, a problem occurring frequently in camera systems will be illustrated based on FIG. 1. FIG. 1 shows a panoramic camera system with cameras 900, whose entrance pupils 902—here, for simplicity reasons, each illustrated as being in front of the objective of the camera 900—are arranged on a common circle 904, such that the cameras 900 are directed radially outward in different directions. FIG. 1 shows, in a shaded manner, critical zones where parallax errors occur, caused by too great a distance of the entrance pupils 902 of adjacent cameras 900, independent of whether a star-shaped or mirror-based structure is selected for the arrangement of entrance pupils.

Usually, a mirror system is used. Thereby, it is possible to place the virtual entrance pupils of all cameras, i.e., virtual images of the real entrance pupils, behind the mirror segments in a common virtual camera center. With such positioning, illustrated in FIG. 2A, where C indicates the common position of the virtual entrance pupils, parallax-free pictures are possible. However, the mirror system has the effect that the captured subimages of the cameras have no overlap, which makes perfect joining, i.e., stitching of the subimages impossible in practice. In earlier applications, such as in theme parks, this had been circumvented by a segmented inaccessible screen, which avoided the necessity of seamless image generation. Recent systems, however, use a tradeoff in the technology, where all cameras are placed such that the virtual entrance pupils lie on a small circle around the intended optimum center. This is illustrated in FIG. 2B, where the circle around the common center C is indicated by 906, the virtual entrance pupils are provided with reference number 908 and the intersection of the mirror segments with the plane in which the virtual entrance pupils 908 lie is indicated by 910. Thus, the arrangement of FIG. 2B does not suffer from the problems in the radial directions 912, where the mirror segments border on one another, since the subimages of the cameras get the necessitated overlap, without the resulting parallax error causing significant limitations. FIG. 3 shows a stereoscopic image of the panoramic camera system with the arrangement of the virtual entrance pupils according to FIG. 3B, wherein the mirror arrangement 912 and the associated cameras 914 can be seen.

The accuracy of positioning the cameras and their entrance pupils determines the extent of the parallax and, hence, essentially the precision of the seamless panorama generation, i.e., stitching. In the scene to be captured, parallax errors can only be accepted subject to specific restrictions. If, for example, only objects in the far range lie within the stitching regions, a greater parallax error will be acceptable than for objects in the near range. The respective criterion is that the resulting parallax error is smaller than one pixel. In order to keep the parallax error sufficiently small to comply with this criterion, very exact positioning of the virtual entrance pupil 908 is necessitated. This again necessitates exact positioning of the cameras and, hence, exact and time consuming calibration, which is accompanied by two essential disadvantages:

The very high effort for exact mechanic positioning of the cameras.
For all degrees of freedom, the cameras need to be able to be moved precisely and to be locked permanently.
The position of the centers of rotation for rotational degrees of freedom cannot be arbitrarily selected. Centers of rotations ideally coincide with the entrance pupils.
Changing a degree of freedom should not result in any further change of other degrees of freedom, i.e., the degrees of freedom are to be orthogonal to one another.
The degrees of freedom are not to change over time, in particular also not by shock or thermal influences.
Determination and control of the desired position.
The exact position of each individual camera resulting from the desired virtual center cannot be readily measured directly. Usually, the same lies within the optics.
When adjusting the optics, the position of the entrance pupils might change.
Additionally, the exact position depends on the residual optical system, such as tolerances of the mirrors.
Determination and control of the common center is performed indirectly via visual control based on the camera images with the help of expensive measurement technology.
Already very small deviations and angle errors have severe consequences and very quickly result in unacceptable parallax errors.

The above requirements result in a very high equipment effort both for the camera system and for the alignment aids, and the calibration is very time-consuming. Even with optimum equipment prerequisites, alignment and control are only possible with expert knowledge and are very time-consuming, which opposes, in practice, the high cost pressure of commercial productions, in particular for live broadcast.

In the system of FIG. 3, for example, all cameras 914 are mounted individually on a holder 916, in order to be individually orientable and lockable in their positions. In this way, for example, each camera 914 is individually translatable in three spatial directions, rotatable around the optical axis and tiltable around two transversal axes. The resulting sixth axis adjustments are to be performed individually for all cameras 914. Obtaining the configuration of, for example, FIG. 2B in this manner is very expensive.

SUMMARY

According to an embodiment, an alignment aid for a camera system of cameras with exchangeable objectives may have: a holder with a plurality of connecting pieces, each implemented for connecting or clamping with a camera housing and/or objective, wherein the holder is implemented such that the connecting pieces or holder modules of the holder, where the connecting pieces are held rigidly or merely at rotation axes, are held rigidly with respect to one another along at least one common spatial direction.

According to another embodiment, a method for aligning a camera system of a plurality of cameras with exchangeable objectives may have the steps of: positioning an inventive alignment aid, such that the plurality of connecting pieces identical to one another each include a connection, fitting or clamping with a camera housing or an objective of the plurality of cameras.

According to another embodiment, a camera system may have: a plurality of cameras with exchangeable objectives; a holder with a plurality of connecting pieces identical to another, each implemented for connecting, fitting or clamping with a counterpart of a camera housing or an objective of a camera, wherein the holder is implemented such that the connecting pieces or holder modules of the holder, where the connecting pieces are held rigidly or merely on rotation axes, are rigid to one another along at least one common spatial direction.

The core idea of the present invention is the finding that it is possible to make the alignment of a camera system less expensive when a holder having a plurality of connecting pieces, each implemented for connecting, fitting or clamping with a counterpart of a camera housing or an objective, is used, i.e., a holder implemented such that the connecting pieces or holder modules of the holder, in which the connecting pieces are held rigidly or merely at rotation axes, are held in a rigid manner to one another along at least one common space direction.

The holder can serve as alignment aid and can thus only be used when aligning the camera system, or the holder remains within the camera system even after alignment during operation of the camera system.

According to embodiments, the connecting pieces objective/camera housing interface are connecting pieces for connection with one counterpart each of a camera housing or an objective, i.e., they form, together with the respective counterpart, for example, but not exclusively, a C mount, a CS mount, a PL mount, an Arri Standard, an Arri Bayonet, Aeton Universal, B4, BNCR, S, CA, PV or FZ connection system, and the holder is only provided for alignment as alignment aid, or the connecting pieces are provided, for fitting with a respective one of the objectives or connecting pieces, for fitting or clamping with an objective/camera interface between the objective and the camera housing of a respective camera. This way, the position accuracy of the entrance pupils of the camera is made easier, since objectives are commonly produced significantly much more precise than camera housings.

The holder can be implemented rigidly between the connecting pieces, such that the connecting pieces are orientated rigidly to one another, both in position and orientation. However, according to further embodiments, the holder is made up of several holder modules in a modular manner.

BRIEF DESCRIPTION OF THE DRAWINGS

Embodiments of the present invention will be detailed subsequently referring to the appended drawings, in which:

FIG. 1 schematically shows critical zones of a panoramic camera system where parallax errors occur due to a too great distance of the entrance pupils of adjacent cameras, wherein the camera system corresponds to the type of FIG. 2B;

DETAILED DESCRIPTION OF THE INVENTION

Figure 4:
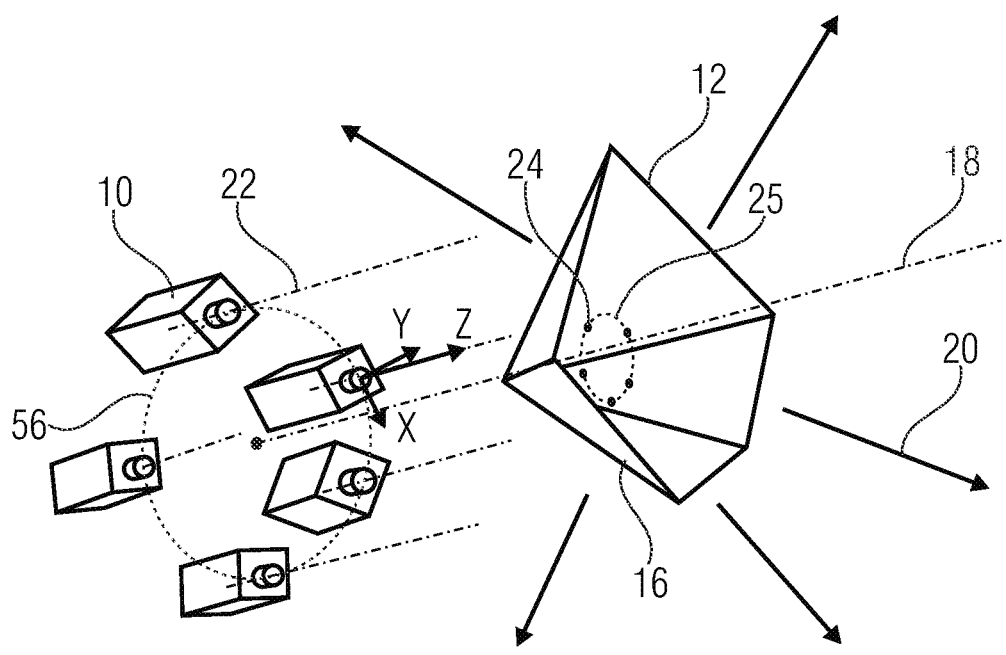
FIG. 4 shows a schematic spatial view of the position of deflection mirror arrangement and cameras of a mirror panoramic camera system, which can be aligned according to the present invention.

For a better understanding of the essence of the embodiments described below and their advantages, first of all, with reference to FIGS. 4 to 7, an option for a calibration aid and a calibration method using the same are described for an exemplary mirror camera system. A schematic three-dimensional spatial view of the mirror camera system is illustrated in FIG. 4. More accurately, FIG. 4 illustrates the ideal positional relationship of the cameras 10 and the mirror arrangement 12 of the camera system 14. However, the illustration is not according to scale and mirror arrangement and cameras are drawn further apart than is actually the case for simplifying the illustration.

Here, the mirror camera system 14 is exemplarily a camera system for panoramic 2D capturing. The cameras 10 are directed radially outwards via five mirror segments 16 of the mirror arrangement 12 from a common axis 18 along radial viewing directions, wherein the number five in FIG. 4 is merely exemplarily and can be two or more. Also, the camera system does not have to allow a 360° all-round view.

The segments 16 are tilted with respect to the common axis 18, such that their surface normals intersect in a common point along the common axis 18 when extending the same to the rear. One camera 10 is allocated to each segment 16. Advantageously, the optical axis 22 of each camera 10 lies in a plane spanned by the surface normals of the allocated mirror segment 16 and the common axis 18 in order to be deflected to the respective viewing direction 20 by the allocated mirror segment 16. The exemplary structure of FIG. 4 is, with regard to rotations around the common axis 18, exemplarily invariant with respect rotations by 360°/number of cameras, but other configurations would also be possible. Additionally, the optical axes 22 of the cameras 10 are exemplarily arranged in parallel to the common axis 18 in FIG. 4 but this configuration is also not mandatory.

Figure 2A:
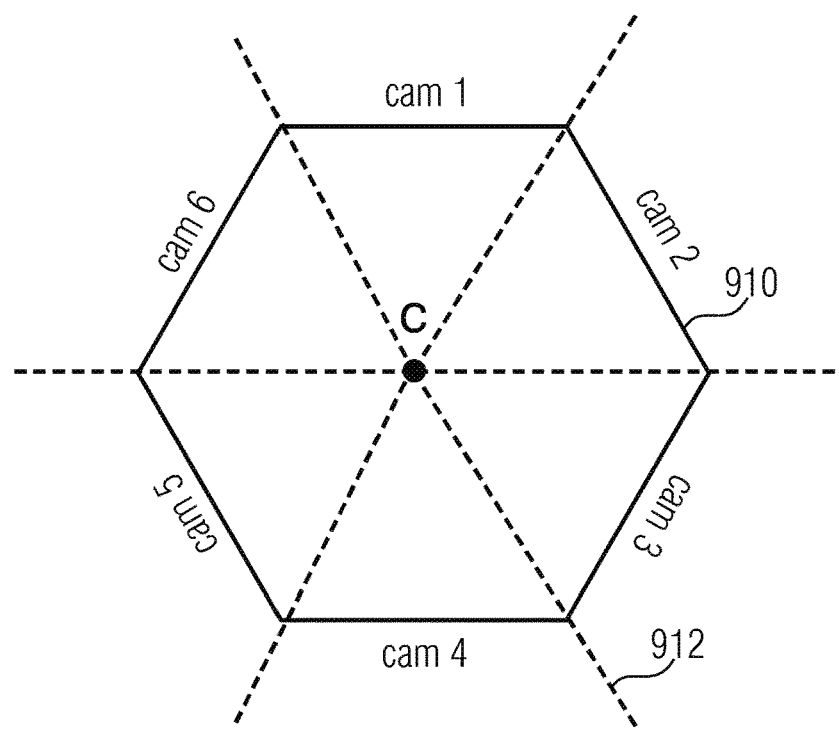
FIGS. 2A and 2B shows schematic drawings for illustrating the optimum position of virtual entrance pupils of a mirror camera system according to two different types.
Figure 2B:
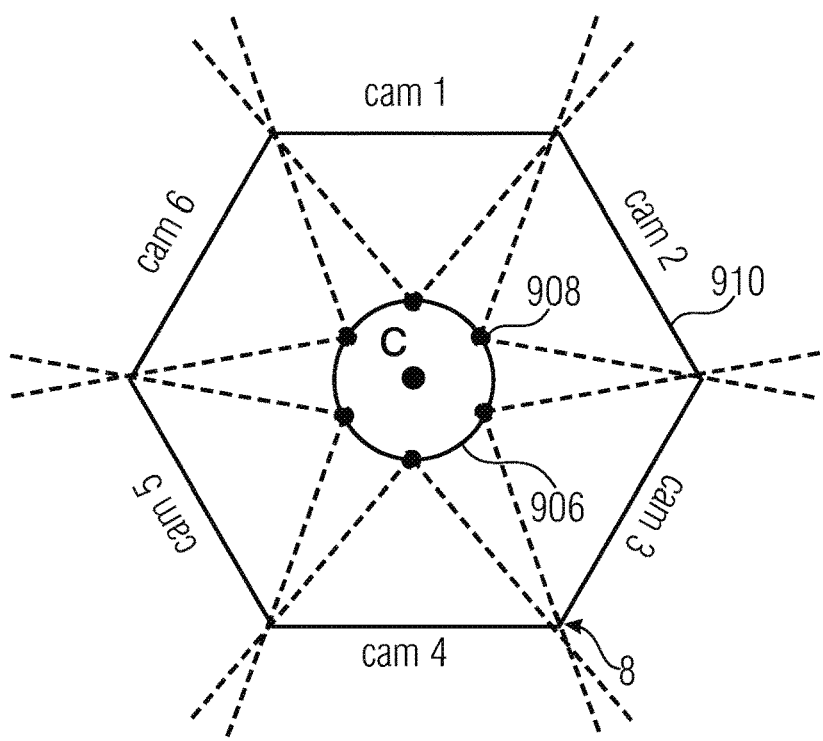

In the ideal alignment according to FIG. 4, the virtual entrance pupils 24 of the cameras 10 are on a circle 25 running symmetrically around the common axis 18, such that the configuration corresponds to the one of FIG. 2B.

As stated in the introductory part of the description of the present application, it is rather difficult to position the cameras 10 such that they correspond to the optimum configuration of FIG. 4.

Figure 5:
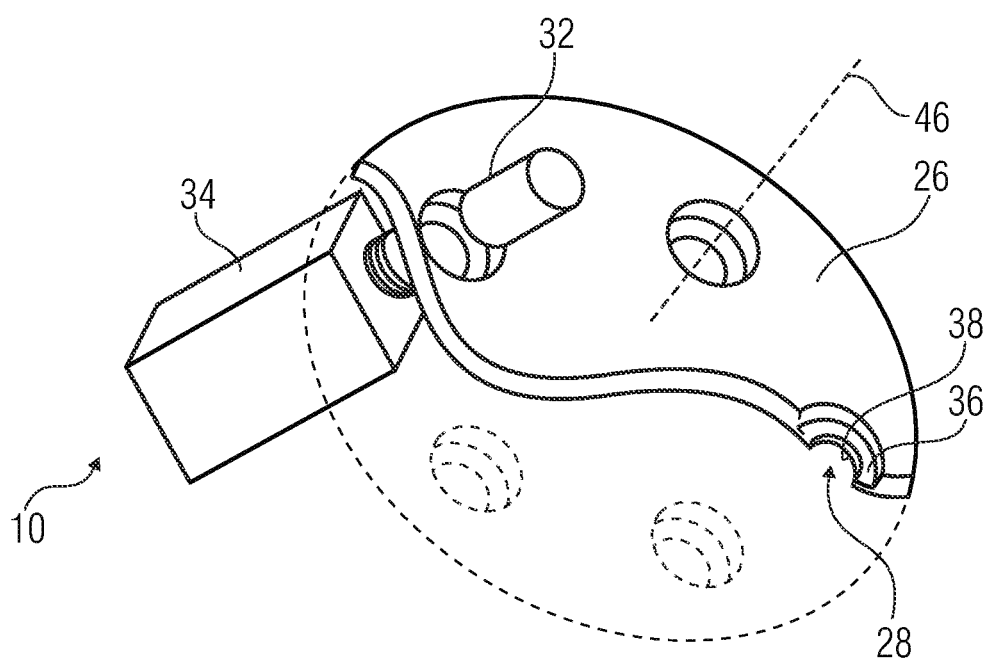
FIG. 5 shows a partial spatial view of the holder according to an embodiment.
Figure 6:
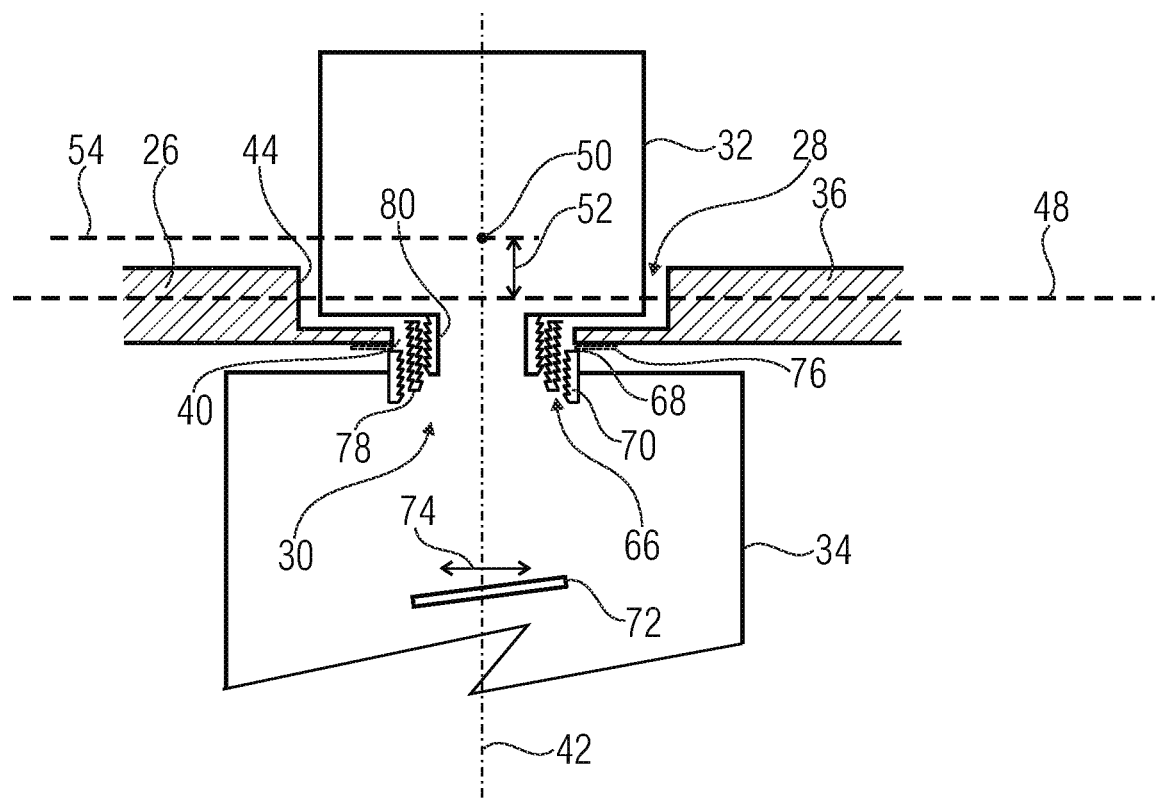
FIG. 6 shows a sectional view through a receiving piece of the holder of FIG. 5.

According to the described procedure, an alignment aid having a holder according to FIG. 5 is used for easier alignment. Here, the holder 26 is exemplarily implemented in a plate shape, however, this plate-shaped implementation is not mandatory but merely represents a material saving implementation. Additionally, according to the embodiment of FIG. 5, the holder 26 is implemented in a rigid manner. A possible material the holder 26 could be formed of would, for example, be metal, plastic, carbon fiber, wood, ceramic or glass. As illustrated in FIG. 5, the holder 26 can be implemented integrally or consist of several parts that are mounted on one another in a releasable or irreversible manner. The holder 26 includes a plurality of connecting pieces 28, each implemented for fitting or clamping with an objective/camera interface 30 between the objective 32 and the camera housing 34 of a respective housing 10, as shown in FIG. 6. In particular, FIG. 6 shows for a connecting piece 28 that the latter comprises a flat portion 36 with an opening 38, through which the camera housing 34 can be connected to the objective 32. The clearing with which the objective/camera interface 30 fits through the opening 38 can be kept small, in that the opening size of the opening 38 is designed for a width of the object/camera interface 30, but this is not mandatory.

By connecting objective 32 and camera housing 34 via their interface 30, the flat portion 36 of the connecting piece 28 abuts on objective 32 and/or camera housing 34. Hereby, the flat portion 36 is possibly clamped between objective 32 and camera housing 34 in order to have a defined positional relationship for objective 32 and/or camera housing 34 in a direction along a rotational axis 42 of the object/camera interface 30, which normally coincides with the optical axis of the camera 10.

As clarified in FIG. 6, the connecting pieces 28 can each comprise a depression or recess 44 for receiving the objective 32 and/or the housing 34 when connecting object 32 and camera housing 34 via their interface 30. Here, the recess 44 can be implemented such that the same allows introduction of objective 32 or camera housing 34 only in a specific rotational position relative to the rotational axis 42. FIG. 6 shows exemplarily that the recess 44 is implemented for receiving the objective 32, but as already indicated, alternatively or additionally, providing a respective recess for the camera housing would also be possible.

Further, although the connecting pieces 28 are all illustrated as being identical, and this identical implementation is advantageous, this identical implementation is not mandatory. For example, in the case of no fitting accuracy, the recesses can also be implemented differently.

Since the alignment aid of FIGS. 5 and 6 is implemented for aligning the system of FIG. 4, in the holder of FIGS. 5 and 6, the connecting pieces 28 are arranged rotationally invariant with respect to rotations around an axis 46 and centers of the connecting pieces are coplanar in a plane 48 which is perpendicular to the axis 46. If the system of FIG. 4 were no all-round panoramic system and did not have all segment camera pairs, the rotation invariance would at least be fulfilled in pairs for the connecting pieces.

In this form, the alignment aid of FIGS. 5 and 6 matches the configuration or arrangement of cameras 10 in the optimum configuration of FIG. 4, because due to the implementation of connecting pieces 28 as illustrated in FIGS. 5 and 6, when connecting objective 32 and camera housing 34 of each camera 10 via a respective opening 38 of a respective connecting piece 28, the entrance pupils 50 of the objective 32 have an unknown distance 52 to the plane 48, which is, however, the same for all objectives 32. Thus, all real entrance pupils 50 are also within a plane that is parallel to the plane 48 of the connecting pieces 28. If the connecting pieces 28 are additionally provided with a fitting accuracy with respect to objective 32 and/or camera housing 34 in lateral directions, i.e. directions running within the plane 48, it can also be obtained by exact production of the alignment aid or the holder 26 that the cameras 10 have, in the state where the same are connected by the connecting pieces 28 via the interface 30, their entrance pupils 50 also in the plane 54 of their entrance pupils in a correct lateral positional relationship, namely along a circle 56 in equiangular arrangement, as illustrated in FIG. 4.

A calibration method according to the present invention uses the alignment aid of FIGS. 5 and 6 for aligning the system of FIG. 4 according to the procedure of FIG. 7 as follows.

First, in a step 56, the alignment aid 26 is positioned such that each camera 10 is connected through the opening 38 of the connecting pieces 28.

The method can also comprise aligning 58 the alignment aid or the holder 26 and the deflection mirror arrangement 12 to one another, but this step is optional, since the step of positioning also inherently results in a mutual alignment of the cameras, and depending on the application, this can already be sufficient. Aligning the alignment aid 58, for example, includes merely aligning the holder 26 and deflection mirror arrangement 12 with respect to one another along the common axis 18, since a suitable guidance, for example, ensures constructively that the plane 48 of the holder 26 is perpendicular to the axis 18, i.e. axis 18 and 46 coincide, and that mirror arrangement 12 and holder 26 are oriented to one another with respect to rotations around the axis 18 such that surface normals of the mirror segments 16 and optical axes 22 of the respectively allocated cameras 10 each lie within a plane leading through the common axis 18. In this case, changing the distance between holder 26 and deflection mirror arrangement 12 resulted in a change of the radius of the circle 26 around the common axis 18, on which the virtual entrance pupils 24 of the cameras 10 lie, whereupon the parallax of adjacent cameras 10 of the mirror camera system of FIG. 4 could be easily adjusted. Further alignments would not be necessitated, because the same took place implicitly in step 56.

During operation of the camera system, the alignment aid of FIGS. 5 and 6 could remain within the camera system. However, embodiments will be described below where that is not possible or not desirable for other reasons. For example, for certain reasons, it may be desirable to remove the alignment aid again prior to the operation of the camera system. Thus, FIG. 7 shows that it would be possible for each camera to fix, in a step 60, camera housing 38 or objective 32 in the state where they are connected to one another via a respective connecting piece 28, to remove thereupon in a step 62 the alignment aid in the state fixed in that manner. Then, in a step 64, the cameras could be assembled again by connecting objectives 32 and camera housing 34 of the cameras 10 to one another again.

Thus, the above embodiment used the fact that normally both camera housing and objectives are precisely produced at their connecting position 30, the objective mount. Examples for such objective mounts are, for example, a C mount, a CS mount or a PL mount. Such connection systems frequently comprise a bayonet catch or, as indicated in FIG. 6 by arrow 66, a screw thread. The reason for precise production is frequently that depending on the application, different objectives of different manufacturers have to match the cameras. This means that the position of the entrance pupil 50 of optics 32 has an exact relation to the objective seat 68 (cf. FIG. 6). This relation is the same for all optics 32 of one type. If, for example, for a multi-camera system like the one of FIG. 4, the same objectives 32 are used, the position of the entrance pupils 50 in a common plane 54 is ensured by using the alignment aid or the holder 26.

Step 56 achieves that all camera housings 34 are mounted with a fixed relation to their objective mount, i.e. their own objective/camera interface connecting piece, in FIG. 6 exemplarily consisting of an internal thread 70, namely in that according to the embodiment of FIGS. 5 and 6, the holder 26 is screwed between camera housing 34 and objective 32 of each camera 10 and hence the connecting pieces are clamped. For that purpose, in the embodiment of FIGS. 5 and 6, each connecting piece 28 comprises, in a base plate for each camera 10, a drilling 38 having, for example, the same radius, which are distributed around a common center, namely the intersection point of axis 46 and plane 48 for the individual mirror segments 16. This positioning 56 results in a rigid connection which immediately fulfills the most important requirement for a multi-camera structure, namely the exact XYZ position of all real entrance pupils 50 to one another within the production tolerances of the objectives. The classical pyramid-shaped arrangement of the mirror segments 16 as shown exemplarily in FIG. 4 in the field of view of the camera also has the effect that the alignment in step 58 is relatively easy. Holder 26 and deflection mirror arrangement 12 can be shifted with respect to one another along the common axis 18. Thereby, as described in step 58, the eccentricity for all cameras 10 can be set to the desired value simultaneously in one operation step, without changing the relatively perfect Z orientation of the real entrance pupils 50 to one another, i.e. the orientation along the optical axis 42.

In this regard, the following should be noted. Within the given tolerances of the optics and the mirrors, with the described procedure according to FIG. 7 and the alignment aid according to FIGS. 5 and 6, both the XY positions, i.e. the position transversal to the optical axis of the respective camera, the real and also the virtual entrance pupils 50, 26 are predetermined with absolute precision and do not have to be amended. The XY positions only depend on the positioning of the drillings 38 on the base plate 26, since the entrance pupil 50 lies on the symmetry axis 42 of the optics 32. The Z position of the real entrance pupil 50, i.e. the position along the optical axis not mirrored by the mirror depends on the respective structure of the optics 32. For example, for specific optics 32, this Z position even shifts in dependence on the focus setting. The Z position of the virtual entrance pupils 24, i.e. the position of the same along the optical axis mirrored by mirroring at the segments 16, is determined by the distance between mirror arrangement 12 and real entrance pupil 50. For being able to use different optics and for being able to match the eccentricity to different scenes, shifting the entrance pupil along the Z axis is desirable. The adjustability is significantly simplified with the help of the holder 26 as described.

Tolerances that can still occur result from non-exactly positioned image sensors 72 within the cameras 10. FIG. 6 shows an image sensor 72 of a camera in a position tilted exemplarily relative to the optical axis 42. Image sensors 72 can also be arranged in an offset manner from camera housing to camera housing in their Z distance to the objective seat 68, i.e. their distance to the objective seat 68 along the optical axis 42. Displacements of the image sensors 72 in lateral direction 74 are most frequent. Since the optical axis 42 still leads through the entrance pupil 50, this does not change anything in the exact position of this entrance pupil 50, such that no parallax errors occur. Position errors 74 of the image sensors show instead in a shifted image section (lens shift) that can be corrected by a simple image section selection or an electronic sensor shift.

If it should still happen that the distances 52 of the real entrance pupils 50 of the objectives 32 of the different cameras 10 vary in the Z direction, i.e. in the direction along the optical axis 42, these variations can be corrected individually for each camera 10 by inserting spacing washers, indicated in FIG. 6 in a dotted manner by 76, e.g. between section 36 and camera seat 68, as it is also common for setting the flange focal length of cameras. Inserting such spacing washers 76 is performed individually for the cameras 10 within step 56.

Mounting the holder 26 between camera housing 34 and objective 32 has the effect that the flange focal length of the camera 10 formed by camera housing 34 and objective 32 is shifted, i.e. the distance between camera housing and objective becomes greater. This can be counteracted by reducing the material strength of the holder 26 in the region of the camera seat 68, as shown in the embodiment of FIGS. 5 and 6 with the flat portions 36. Some cameras 10 have a sufficient adjustment option for the flange focal length. FIG. 6 illustrates such a case, where in this objective/camera housing interface 30 an intermediate piece 78 provided with an external and an internal thread is provided between the connecting piece 70 of the camera housing 34 provided with an internal thread and the connecting piece 80 of the objective 32 provided with an external thread. By such an adjustment option, the material strength of the holder 26 in the region 36 provided with the opening 38 can be compensated.

Figure 7:
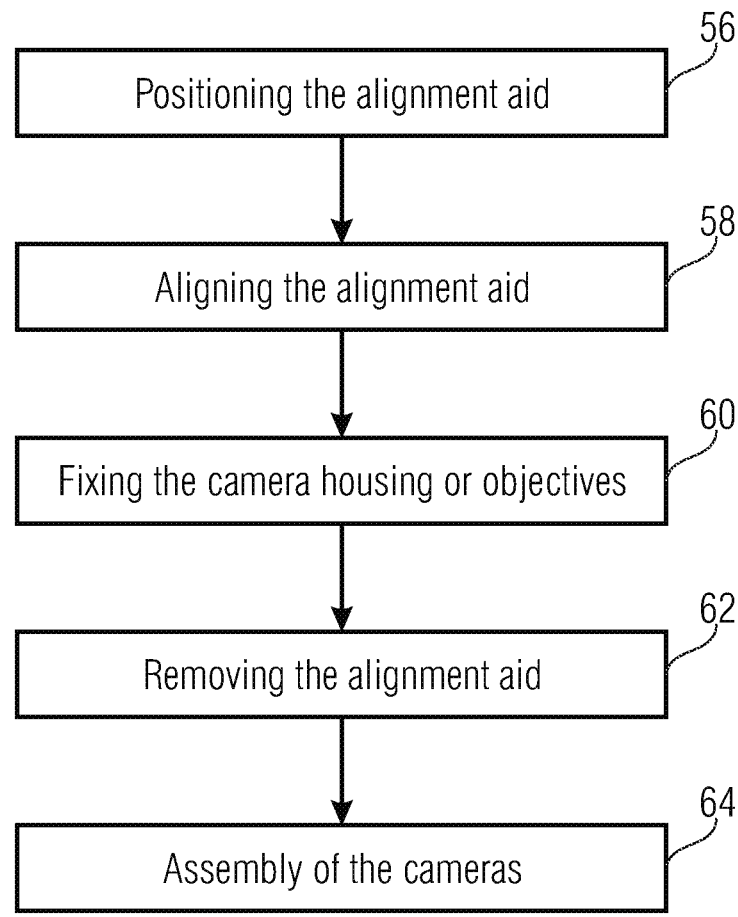
FIG. 7 shows a flow diagram of a calibration method according to an embodiment.

If, however, as illustrated in FIG. 7 by possible steps 62 and 64, the holder 26 is not used for mounting during operation, but only for assembly or alignment, i.e. as alignment aid, the above-described adjustability of the flange focal length can be omitted, in that the cameras with the objectives are mounted on the holder 26 in step 56 in the described manner, and the cameras are subsequently permanently secured to a suitable mount, such as with the help of lockable hinges, namely in step 60, but finally the holder 26 is removed again. Depending on the quality of the mount, the cameras 10 maintain the respective orientation. The flange focal length of the cameras remains unchanged. The latter procedure can be advantageous when using bigger and hence heavier cameras, since with such cameras the objective amount 30 can possibly not carry the whole camera weight of the cameras 10, or, vice versa, the holder 26 would have to be structured in a very bulky manner.

Figure 8:
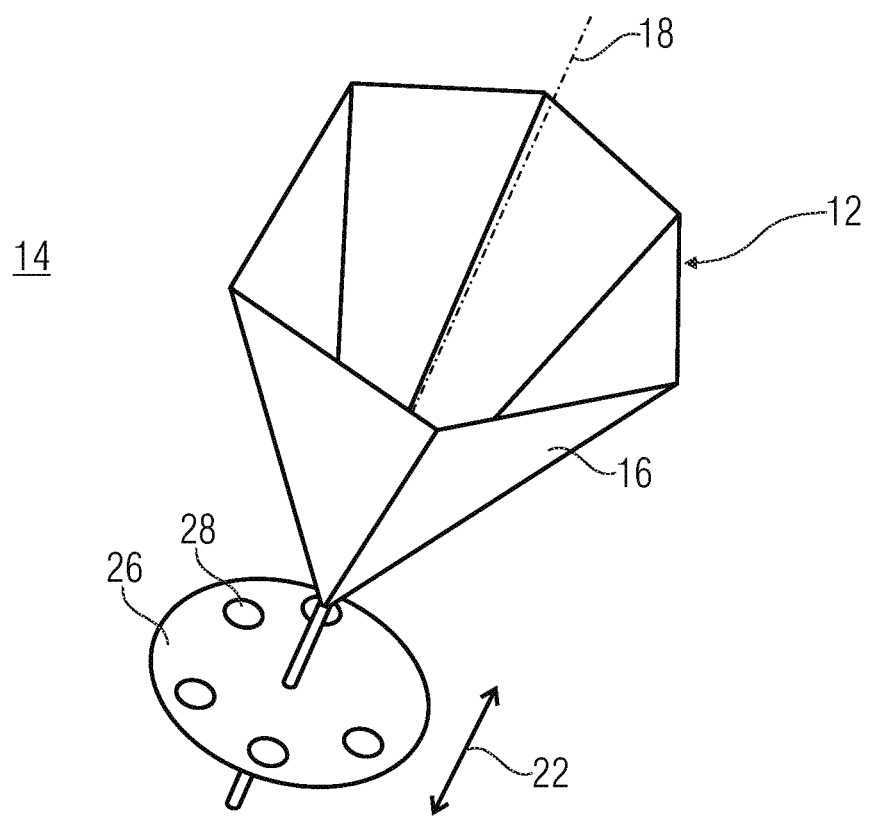
FIG. 8 shows a spatial view of a panoramic camera system with illustration of a mutual position between holder and deflection mirror arrangement according to an embodiment.

For completeness sake, FIG. 8 shows again an example for a panoramic camera system of the type of FIG. 5, where the holder 26 can be provided for remaining, at its connecting pieces 28, between objective and camera housing of the respective cameras even during operation of the panoramic camera system. Merely exemplarily, FIG. 8 again comprises five pairs of a mirror segment 16 and respectively allocated connecting pieces 28 for a respective camera in an equiangular arrangement. Obviously, the number could differ, as well as the intermediate angles. For clarity reasons, the cameras are not shown in FIG. 8. As is described in FIG. 7 the same are assembled within step 56 at the connecting pieces 28 through the respective opening 38. As stated, the camera system 14 of FIG. 8 can comprise a guidance via which deflective mirror arrangement 12 and holder 26 are movable with respect to one another. The guidance ensures that the symmetry axis 46 of the holder 26 and the common axis 18 of the system 14 run collinearly and the segments are not twisted against one another around the axis 18 with respect to the connecting pieces 28. The guidance with movability is illustrated in FIG. 8 with the double arrow 82. In the same way, the guidance could also prevent tilting of the plane 48 with respect to the common axis 18.

Figure 9:
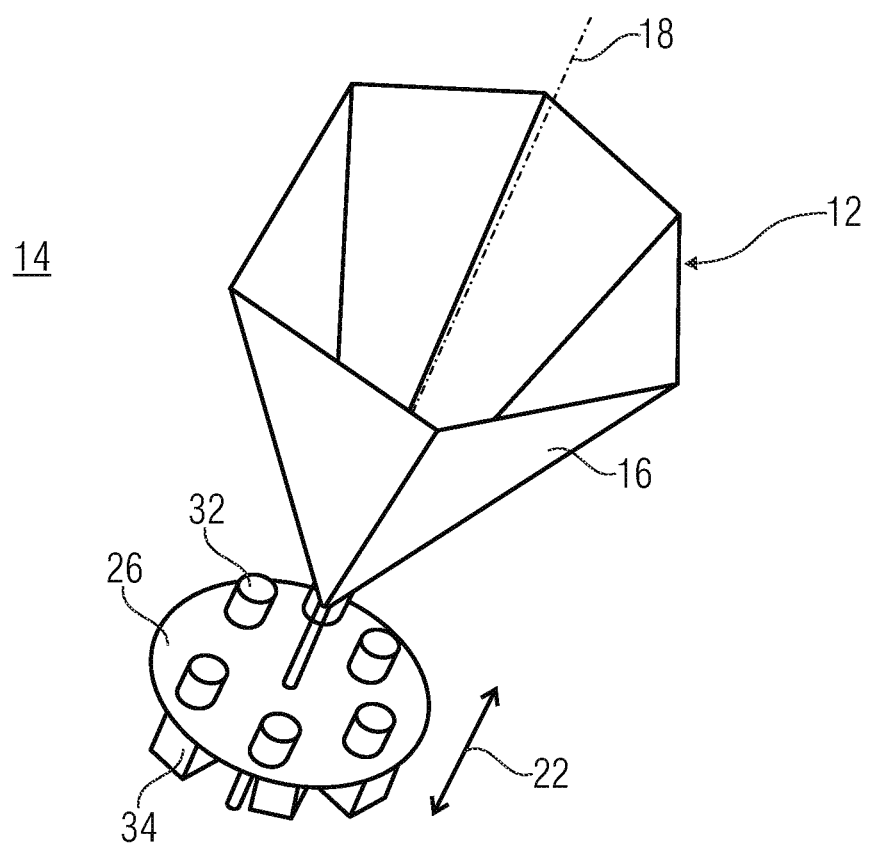
FIG. 9 shows a spatial view of the multi-camera system of FIG. 8 with cameras mounted on the holder.

Merely for completeness sake, FIG. 9 shows the system of FIG. 8 again in the situation as it results after step 56, i.e. in the state where the objectives 32 and camera housings 34 of the camera 10 are connected to one another through the openings 38 of the connecting pieces 28 of the holder 26. Thus, FIG. 9 can illustrate a completely calibrated camera system or an intermediate status when performing the method according to FIG. 7, where another fixing of the camera housing or the objectives with subsequent removal of the alignment aid takes place.

Figure 10:
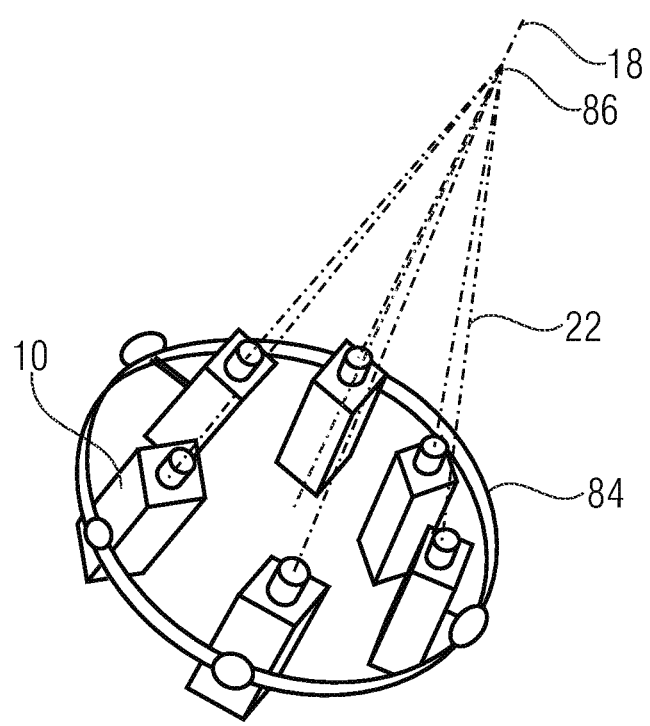
FIG. 10 shows a spatial view of a schematically illustrated locking device for locking an aligned state after removing an alignment aid.

FIG. 10 is to illustrate, for example, that cameras 10 of a multi-camera system, after alignment and subsequent removal of the alignment aid and assembly of the cameras 10 according to FIG. 7 can be held in the state fixed in step 60 by a suitable holding device 84 in the aligned state. FIG. 10 shows also exemplarily that the panoramic camera systems as illustrated in the above FIGS. 4, 8 and 9 are obviously not limited to the fact that the optical axes 22 of the camera 10 run parallel to one another and to the common axis 18. Rather, the same can meet in the panoramic axis 18, for example in a common point 86. Depending on the inclination of the mirror segments of the deflection mirror arrangement relative to the common axis 18, the optical axes of the cameras 10, after their deflection by the respective mirror segment, can still run coplanar in a plane perpendicular to the panoramic axis radially through the axis 18.

In the following, some extension options and alternatives to the above description are presented.

Figure 11A:
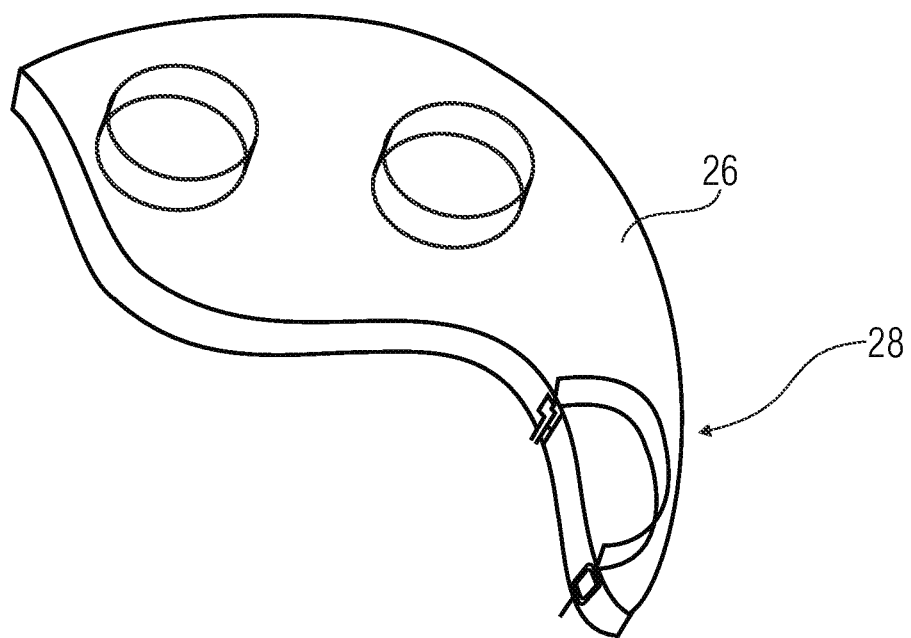
FIG. 11A shows a spatial view of a holder for implementing an alignment aid according to an embodiment.
Figure 11B:
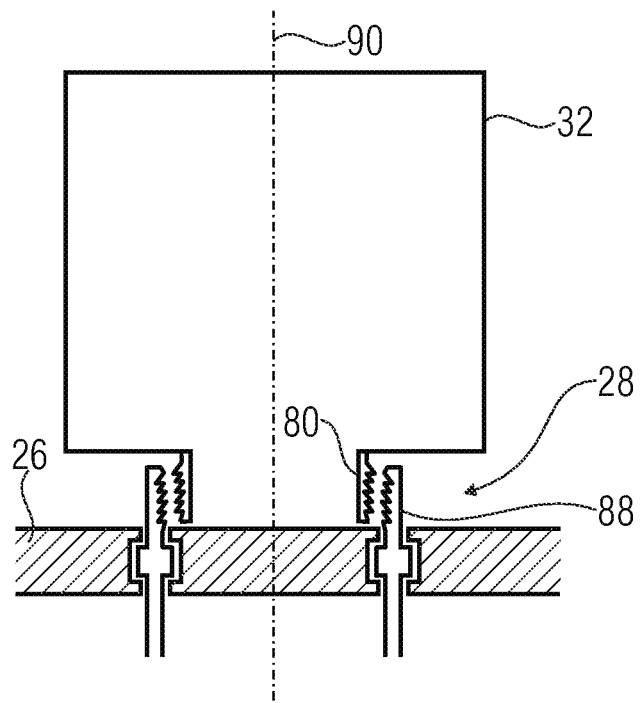
FIG. 11B shows a sectional view through a connecting piece of the holder of FIG. 11A.

FIGS. 11A and 11B show, for example, a variation of an alignment aid where the holder 26 is not implemented integrally and the alignment aid is not intended to remain within the aligned camera system. In particular, the connecting pieces 28 of the holder 26 of FIG. 11A are implemented differently. The same are respective objective/camera housing interface connecting pieces 88, in the case of FIG. 11B, for example, a connecting piece 88 for a connection to a counterpart 80 of an objective 32, although it would also be possible vice versa. In this case, the connecting pieces 88 are pivoted around a rotational axis 90. Thus, the connecting pieces 88 are rotatable in step 56 for connection to the objective 32 and the same applies to the removal of the alignment aid in step 62.

Figure 11C:
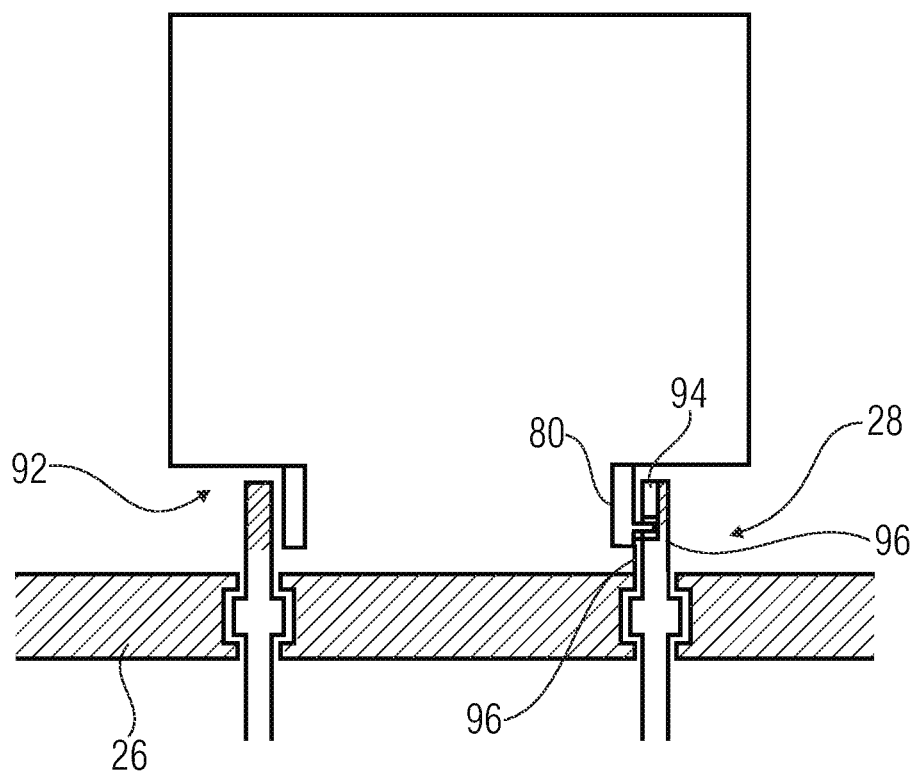
FIG. 11C shows a sectional view through a connecting piece of the holder of FIG. 11A according to another embodiment with a bayonet catch instead of a screw thread.

According to FIG. 11B, the objective/camera housing interface connecting piece 88 forms, together with the counterpart 80, a screw thread closure, but FIG. 11C shows as an alternative that the same could also be a bayonet catch 92, where the connecting piece 28 is formed, for example, by a part 96 comprising a groove 94, and the counterpart 80 is formed by a projection 96 guided in the groove 94 or vice versa. Closing the connection and also releasing the connection takes place by twisting connecting piece 88 and counterpart 80 against one another along the rotational axis 90, which normally runs collinear to the optical axis of the camera.

Figure 12:
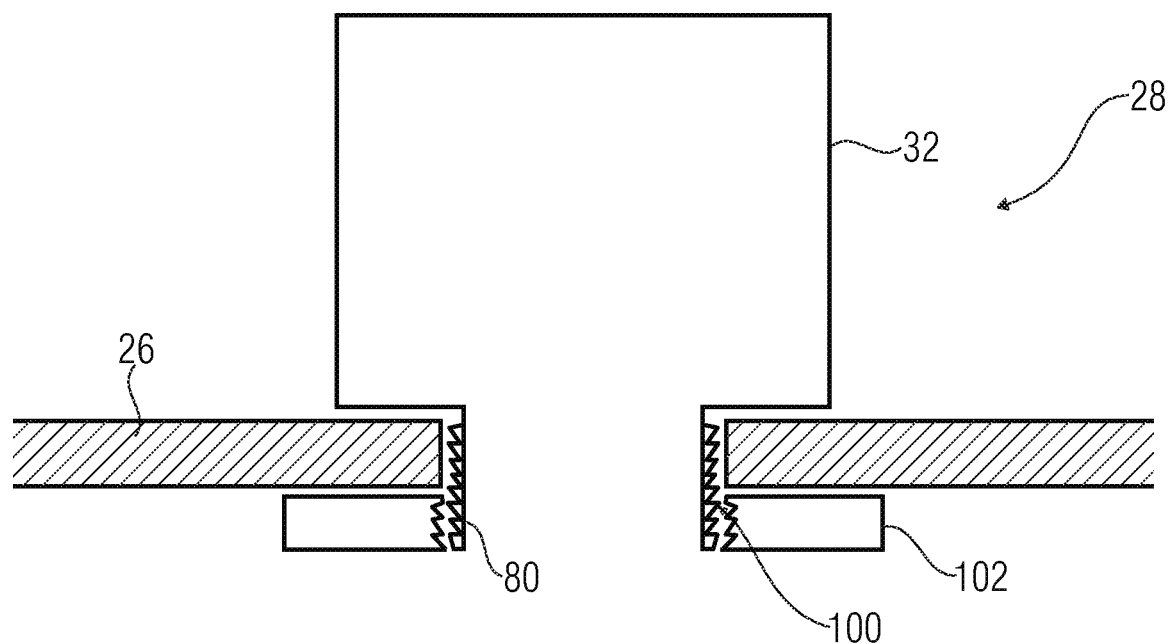
FIG. 12 shows a sectional view of a connecting piece of a holder according to a further embodiment.

FIG. 12, however, shows that the connecting pieces 28 of the holder 26 can merely comprise openings 100 through which, for example, a counterpart 80 of an objective 32 fits, for example to be held, within step 56, for the purpose of improved operability during positioning and possibly aligning in step 58, from a side opposing the objective 32, such as with a nut 102, when, as shown exemplarily in FIG. 12, the counterpart 80 is a camera housing/objective interface connecting piece provided with an external thread provided by the objective 32 for screwing in into a counterpart of a camera housing provided with an internal thread.

In particular with small cameras/objectives, mounting could also be performed directly at the objective. Therefore, it could be sufficient for example to press the objectives into the common holder, for example, a plate. Ideally, this takes place close to the entrance pupils as it was the case in the previous embodiments. Alternatively, mounting or fitting can also be performed directly at the camera when the same has a precise reference to the optics. In general, with a greater distance of the entrance pupil to the optics, the error resulting from production tolerances increases.

Figure 13:
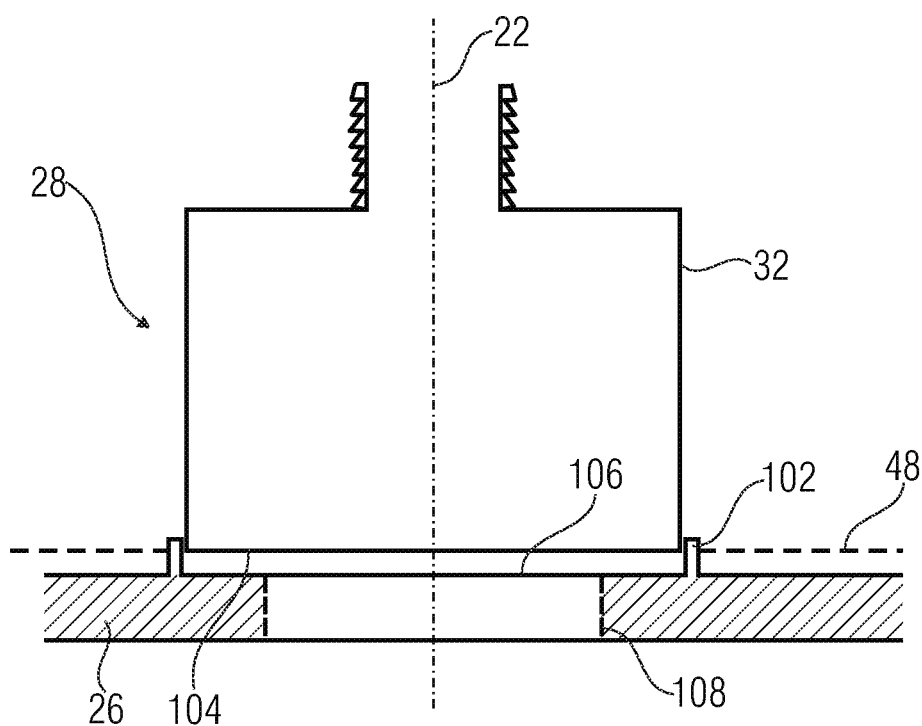
FIG. 13 shows a sectional view of a connecting piece of a holder according to a further embodiment.

FIG. 13 shows, for example, that it is possible to form the connecting pieces 28 of the holder 26 by the fact that the connecting pieces comprise projections 102 for receiving or fitting a front 104 of a respective objective 32. When positioning the alignment aid in step 56, the objectives 32 would be introduced into the recess of the respective connecting piece 28 formed by the projections 102 in order to be fixed in lateral direction, i.e. transversal to the optical axis of the objective 32 by the projection 102, and to be seated on the holder 26 in the direction of the optical axis 22. In other words, the area of the holder 26 within the projection 102 formed an abutment region 106, which is implemented such that when inserting the objective 32 with its front or light entry side 104 into the recess formed by the projection 102 up to touching and abutting on the seat region 106, the optical axis 22 is perpendicular to the plane 48 of the common centers of the connecting pieces 28. Possibly, however, predefined tilting of the seat region 106 or the optical axis 22 in the inserting state of the objective 32 with respect to a normal of the plane 48 could be desired. Possibly, the objectives 32 are additionally held in some other manner in order to not lose abutment with respect to the abutment region 106 during positioning 56. In the version as illustrated in FIG. 13, the holder 26 could either serve as alignment aid to be removed again prior to operation of the respective aligned camera system, or as a holder for remaining within the camera system. In this case, however, an opening 108 would be provided in the inner region of the seat region 106, as illustrated by dotted lines in FIG. 13, through which the objective 32 or the camera comprising the same could see.

Figure 3:
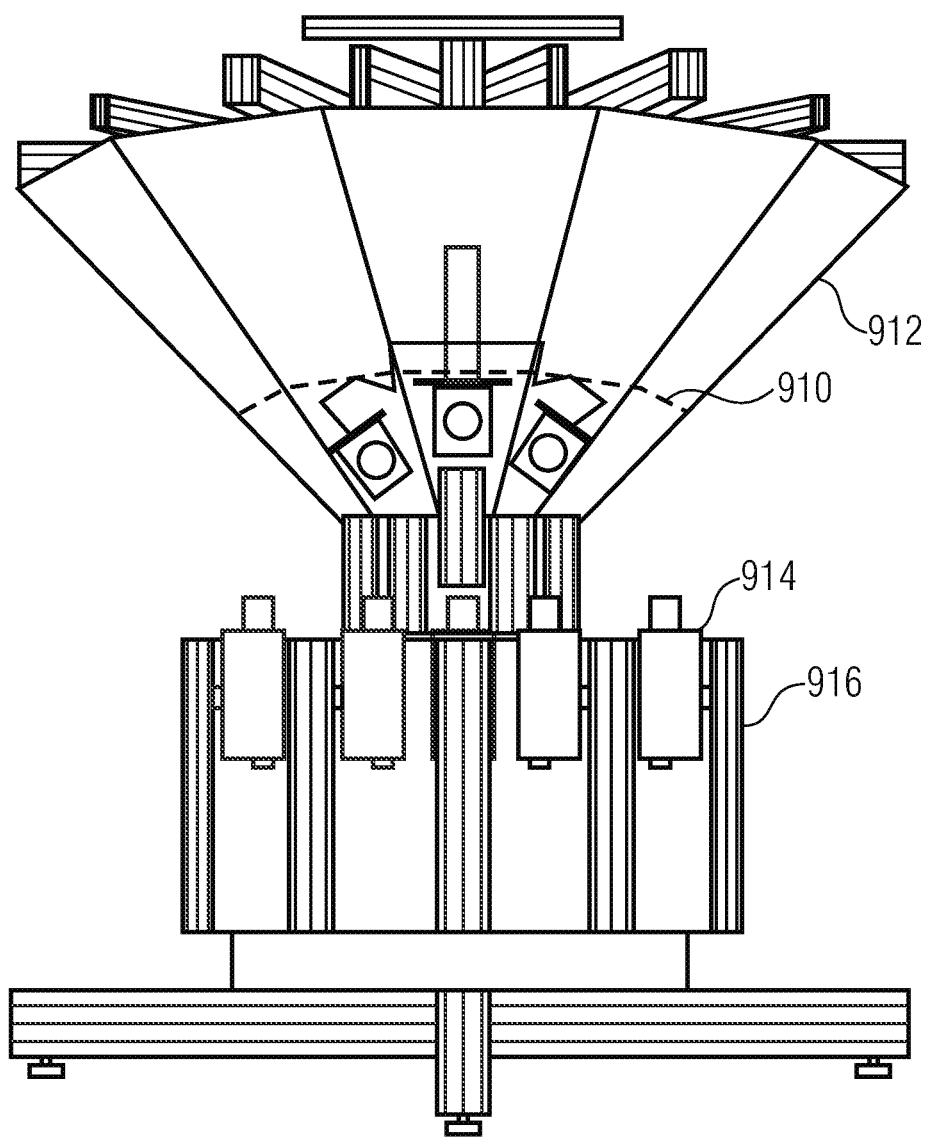
FIG. 3 shows a spatial view of a mirror camera system of the type of FIG. 2B.
Figure 14:
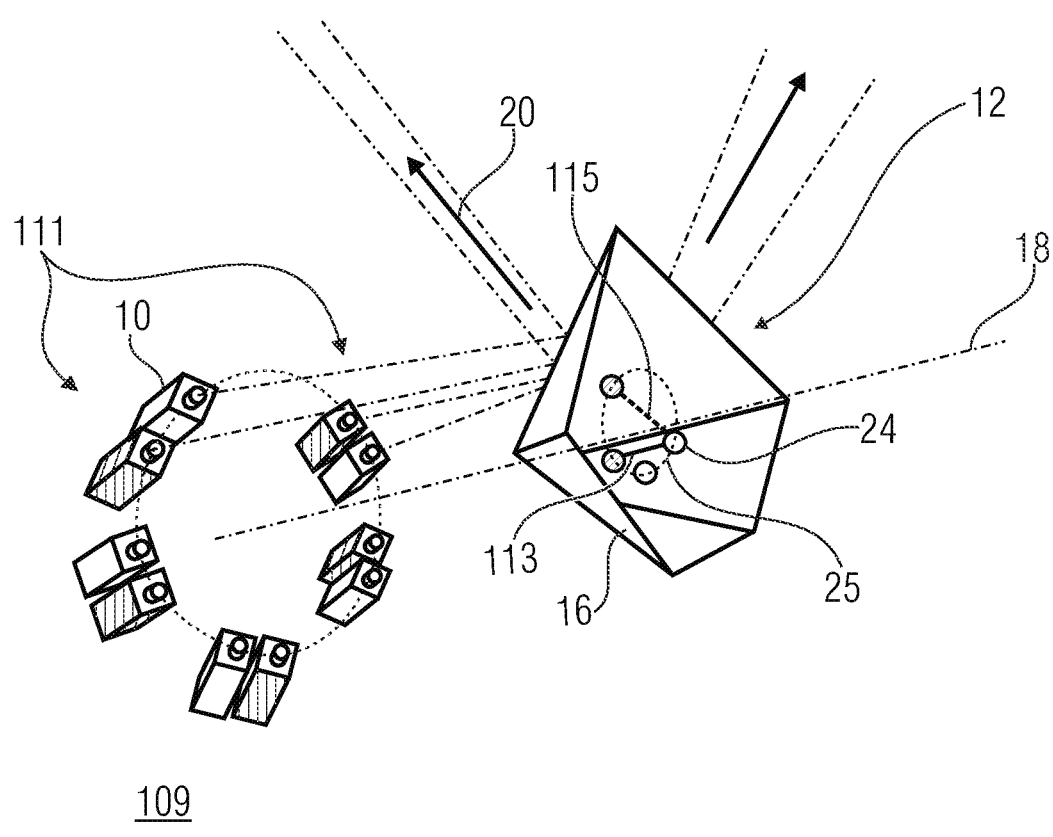
FIG. 14 shows a schematic spatial view of the position of deflection mirror arrangement and cameras of a 3D panorama mirror panoramic camera system which can be aligned according to the present invention.

In the above embodiments, the holder was essentially structured in a rigid manner, i.e. the connecting pieces 28 had rigid positions to one another. However, this is not necessitated according to all embodiments. This will be described below based on an embodiment for a holder that could be suitable for aligning a 3D panoramic mirror camera system. Such a 3D panoramic mirror camera system is known, for example, from WO 2012/136388 and illustrated exemplarily in FIG. 14 as an extension of the system of FIG. 4 to 3D panoramic pictures. In this system 109, in an optimally aligned state, two cameras, one of which is allocated to a left channel (shaded) and the other camera 10 to a right channel (unshaded), are oriented outwards via a respective segment 16 of the deflection mirror arrangement 10. Optimally, the cameras are aligned such that the virtual entrance pupils 24 from cameras 10 of left channels (shaded) as well as the entrance pupils of cameras of right channels (unshaded) are again on a common circle 25 around the common axis 18 (in FIG. 14 illustrated exemplarily only for the two camera pairs 111 illustrated with solid lines), such that the base distance 113 of each camera pair, i.e. the distances of the virtual entrance pupils 24 of the cameras allocated to the same segment 16 are approximately equal to the distance 115 between the virtual entrance pupil 24 of the camera of the left channel of the camera pair of a segment to the entrance pupil 24 of the camera of the right channel of the camera of the segment positioned, with respect to that segment, towards the right looking radially outwards. In that way, the base distances 113, 115 both within each segment and between adjacent segments are equal and it is possible to obtain 3D panoramic scenes, such as a panoramic image, by stitching all images of all cameras of the left channels as well as a panoramic image by stitching all images of the cameras of the right channels, and the base length still remains constant across the whole panoramic region.

For the just outlined structure according to FIG. 14, it can be also desirable to be able to adjust the base length of each camera pair. The holder 26 of FIG. 15 has two parts pivotable to one another around the normal 46 to the plane of the connecting piece centers, wherein in the top view of the plane of the connecting piece centers of FIG. 15, one member 26a is illustrated in a shaded manner and the other 26b without shading. Each member 26a and 26b is implemented in a rigid or integral manner and has a number of segment portions 110, here, exemplarily three, equal to the number of the other member, wherein one connecting piece 28 each is formed. The segment portions 110 circumferentially alternate the common rotational axis 109 of the members 26a and 26b such that one segment portion 110 of the member 26b respectively lies between two segment portions 110 of the member 26a and vice versa. The segment portions 110 of the two members 26a and 26b leave gaps 112 in tangential direction, such that by rotating the two members 26a and 26b against one another around the rotational axis 109 the connecting pieces 28 can be changed in their lateral position to one another. In particular, as in the case of FIG. 2, the connecting pieces 28 are arranged on a common circle 114 centered around the rotational axis 109 and this position on the circle 114 is maintained, even when rotating the members 26a and 26b against one another around the rotational axis 109. However, the distances 116 of adjacent connecting piece centers change. If, for example, the connecting pieces 28 of the member 26a are implemented for the cameras of one channel, and the connecting pieces 28 for the cameras of the respective other channel, twisting the two members 26a and 26b against one another can change the base length 116 of the camera pairs, i.e., the distances of the connecting piece centers of pairs of adjacent segment portions 110. Despite the twistability around the axis 109, the mere positioning of the alignment aid according to step 56 has the effect that the entrance pupils of the cameras lie in a common plane parallel to the connecting piece center plane. The connecting piece center distances also remain the same in pairs for adjacent connecting pieces 28, for each degree of twist between the members 26a and 26b without necessitating further alignment.

Figure 15:
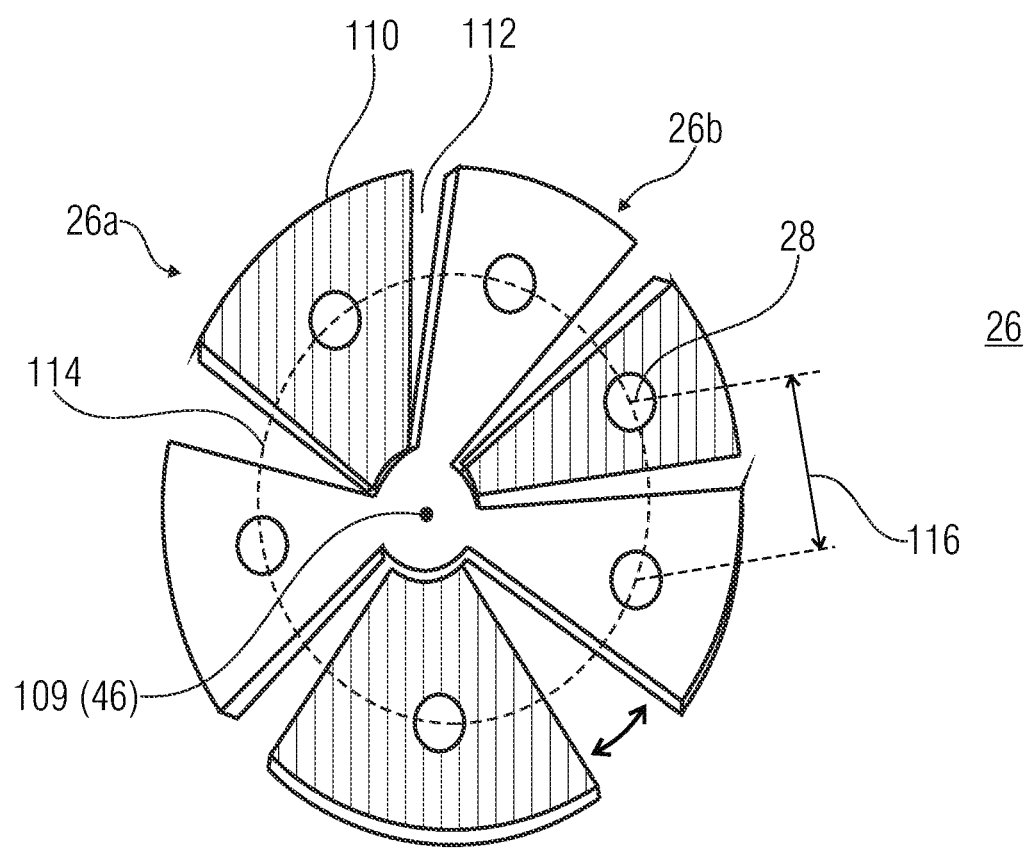
FIG. 15 shows a schematic top view of a modular holder according to an embodiment suitable for the system of FIG. 14.

The embodiment of FIG. 15 is an example that the connecting pieces 28 do not have to be implemented such that the optical axis runs perpendicular to the connecting piece center plane when connecting, fitting or clamping with camera housing and/or objectives. In a 3D panoramic mirror camera system of the above type it can be advantageous when each camera pair looks into its allocated mirror segment in a squinting manner, in which case the connecting pieces 28 of the cameras forming a stereo pair would align the optical axes in adjacent segment portions 110 such that the same are tilted to one another in viewing direction.

Thus, FIG. 15 is also an example for the fact that the holder 26 can be formed of holder modules in a modular manner. In the case of FIG. 15, the holder modules are formed by members 26a and 26b.

Figure 16A:
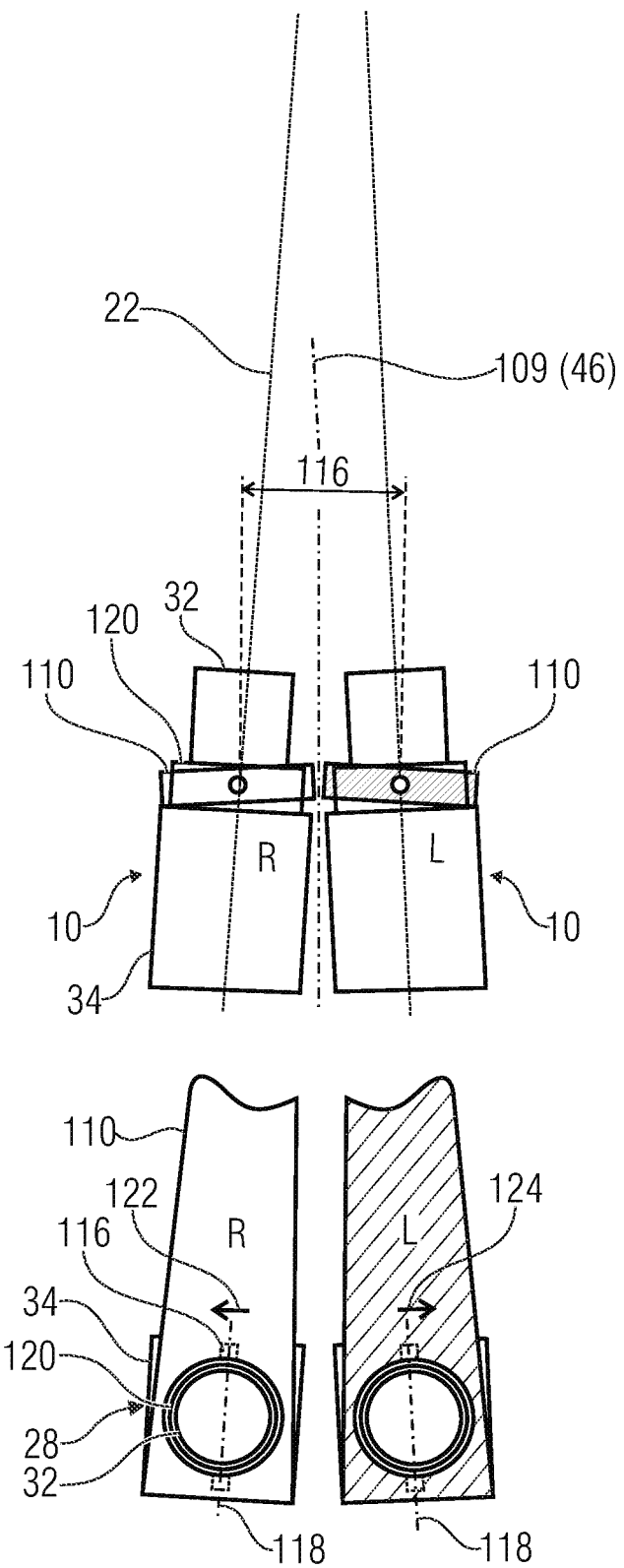
FIGS. 16A and 16B show side views of a pair of segment portions of the holder of FIG. 14 in states of different rotations of the holder modules of FIG. 14.
Figure 16B:
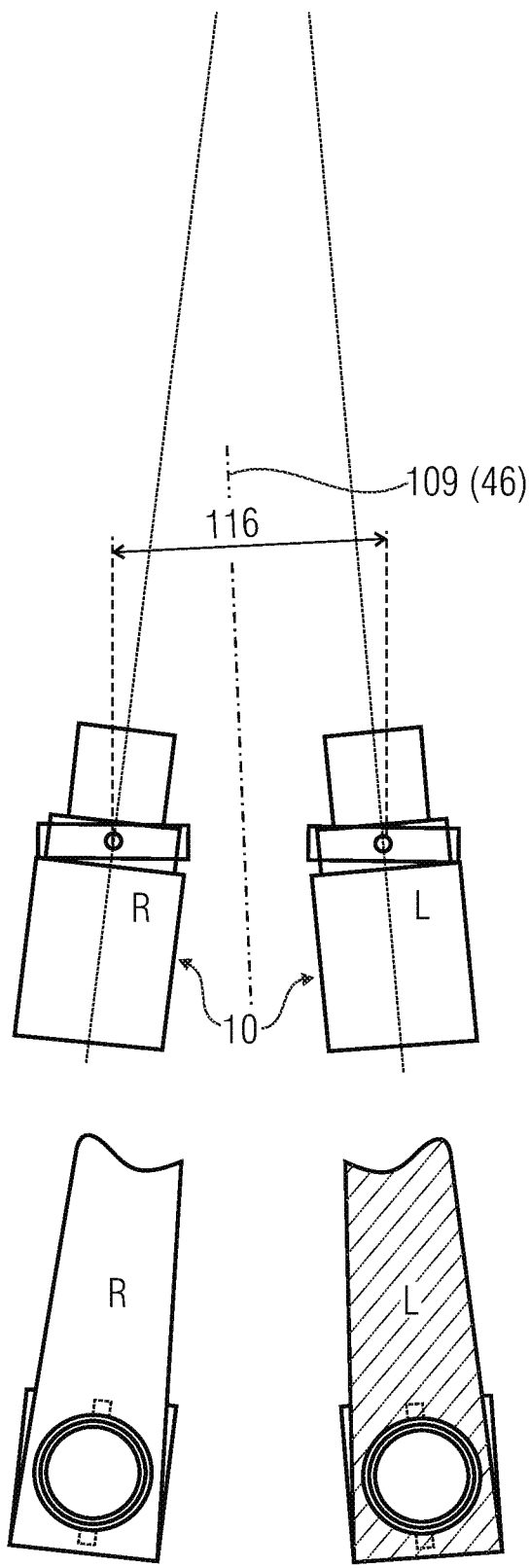

FIGS. 16A and B show an example for the fact that the extent of the modular implementation of the holder can still be increased. FIGS. 16A and 16B represent different rotations of the members 26a and 26b of FIG. 15 to one another, i.e. differently adjusted base lengths 116. However, the modules 26a, b are themselves implemented in a modular manner. The top half of FIG. 16a and FIG. 16b illustrates views resulting when looking from the outside onto the rotation axis 109 in the center of the base length 116, and the bottom half of these figures shows the respective view parallel to the axis 109 onto the respective segment portions 110. Since, when changing the base length 116, the mirror segment for the cameras 10 allocated to the respective stereo pair of cameras 10 is located in different directions, it can be desirable to change a tilting of the optical axes 22 of the cameras 10 with respect to the connecting piece center plane or the normal 46 when changing the base length 116, i.e. twisting the modules 26a or 26b against one another around the axis 109. For that, each segment portion is again structured in a modular manner: each segment portion 110 holds a holder module 110, pivoted around a pivot axis 118 via a hinge 116, which again comprises or forms the connecting piece 28 of the respective segment portion 110. According to the embodiment of FIGS. 16A and 16B, the pivot axis 118 leads through the rotation axis 109 in the connecting piece center plane. In that way, squinting of the cameras 10 of a camera pair can be changed. It would be possible to couple the tilting of the cameras 10 of the left channel L and the right channel R within each camera pair to one another, such that the tilting with respect to one another for squinting is, for example, symmetrical to the plane leading through the rotating axis 109 and the center of the base length 116. However, the pivoting axes 116 could also be twisted against one another on purpose for each camera pair symmetrically to the above stated plane in the plane of the connecting piece center plane as illustrated by arrows 122 and 124 in order to allow, at least for a predetermined rotating position between member 26a and 26b, that the optical axes 22 of the cameras 10 of each stereo camera pair are coplanar to one another.

In a further manner not illustrated in more detail in FIGS. 16A and 16B, even the hinges 122 and 124 within one axis can be twistable in an axis perpendicular to the connecting piece center plane in order to allow for each rotational position of members 26a and 26b to one another that the optical axes 22 lie within one plane. Coupling the rotation around the latter axes could be used for coupling the rotation of members 26a and 26b to the rolling rotations of the modules 120 such that the degree of squinting changes depending on the base length such that the mirror segment allocated to the respective camera pair is within the field of view of both cameras of this camera pair and such that the optical axes 22 are coplanar.

Even in the embodiment of FIGS. 16A and 16B, the holder 26 already inherently provides the coplanar arrangement of the real entrance pupils and hence, the advantages that have already been stated above based on the other embodiments.

Thus, the above embodiments obtained the elimination of several problems that have been described in the introductory part of the description with regard to known camera systems and their alignment. The objective mount related mounting according to the above embodiments via the connecting pieces 28 has, for example, the following effect. Mounting the cameras at their object seat has the effect that the entrance pupils of all cameras are at an exact position when the holder is designed accordingly. This has the following advantages:
1) No expensive apparatuses for mechanically aligning the cameras have to be provided.
2) This again results in a possibly even drastic miniaturization of the overall system, allowing a significantly simpler structure since smaller forces and lower levering effects result.
3) Additionally, no expensive and error-prone orientation of the cameras is necessitated.
4) Additionally, expensive calibration tools as mentioned in the introductory part of the description can be omitted.
5) In the embodiments described above, the precise adjustment cannot change anymore after mounting. So far, the presence of adjustment options and the clearance of the same had the effect that adjustment were not maintained, and in particular after transporting the cameras a renewed adjustment had become necessitated.
6.) With the above embodiments, parallax-free pictures become possible even in the close range, which avoids expensive post-processing and allows live applications.

A central Z adjustability in the sense of movability of the holder in a direction perpendicular to the plane of the connecting piece centers obtains a central shift of the deflection mirror arrangement to the cameras, obtaining a common shift of the Z position of the virtual entrance pupils. The accompanying advantages are:
1) A scene-dependent adjustment of the eccentricity is performed for all cameras together in one operating step.
2) The shift along the Z axis is performed for all cameras together.
3) The precise orientation of the entrance pupils on the Z axis is maintained, the Z coordinates of all cameras are the same.
4) Specific optics have the characteristic that the entrance pupil shifts on the Z axis when the focusing plane is changed. These optics have so far been not suitable for the usage in precise multi-camera systems. The central Z shift can be used for compensating this shift.

Figure 17:
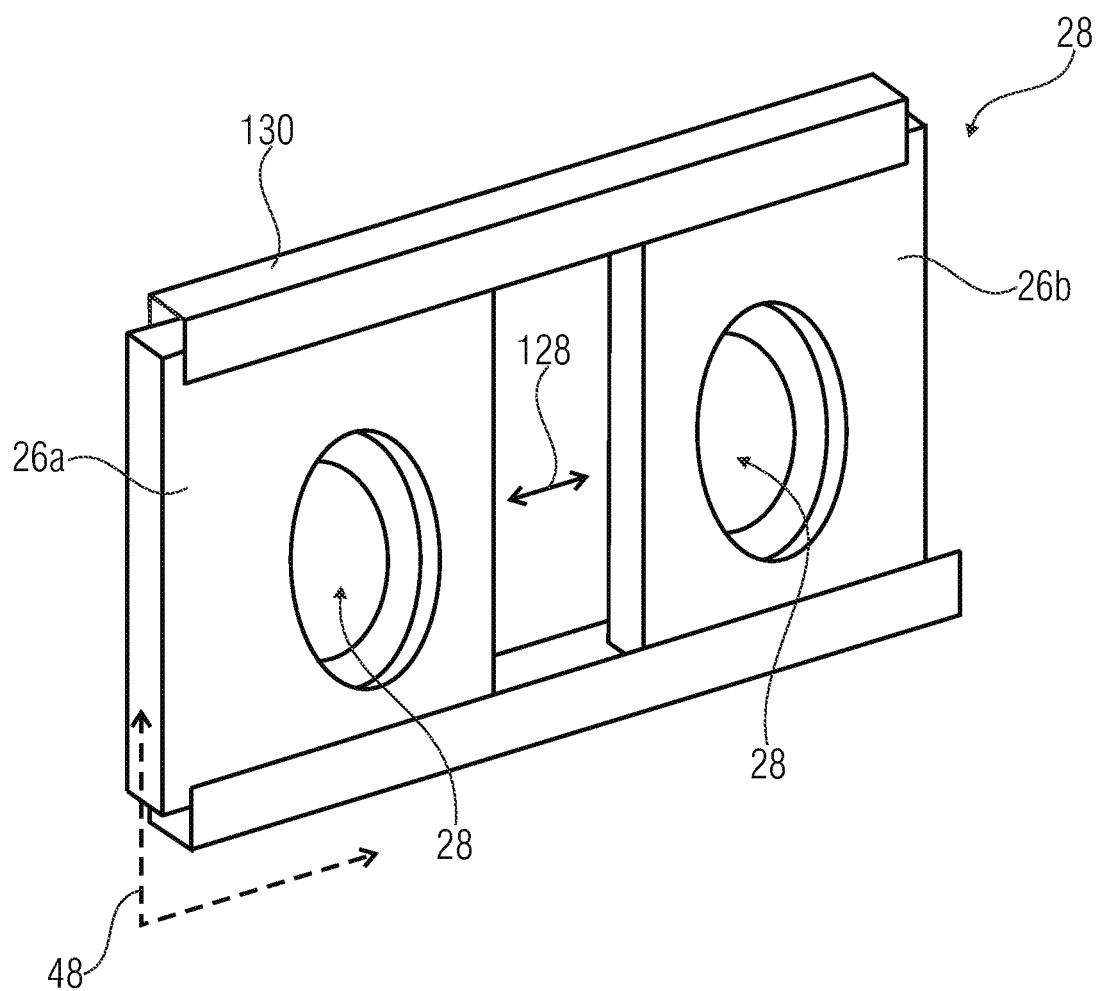
FIG. 17 shows a spatial view of a holder module in modular implementation for a stereo camera system according to an embodiment.

The type of mount or orientation on the objective seat can generally also be used for mounting multi-camera systems, such as for axially parallel stereo systems. For that, merely a simple shift of the divided base plate is useful for allowing a base adjustment. This is illustrated again in FIG. 17 where the holder 26 comprises two holder modules 26a and 26b, each of which forming a connecting piece 28 or comprising the same, wherein the modules 26a,b are shiftable in the connecting piece center plane 48, such that the same are translatable as indicated by a double arrow 128. The guidance is indicated by 130.

Thus, the above embodiments allow calibration of camera systems such that the same can generate high-resolution, high-quality pictures. In particular, high-resolution video panoramas can be obtained with a multi-camera system. The fields of application of the above embodiments are not limited to the ones described. The fields of application are, for example, panoramic productions for theme parks and the transmission of events, such as concerts and sports events in panoramic format. A further field of application is the production of a high-resolution overall view of a scene, in order to allow virtual tracking shots within a virtual production. The same can be performed either offline or live. Depending on the application, this navigation can be performed centrally for several or all viewers or individually, such that each user can operate his own virtual camera. This also allows a simple structure of, in the simplest case, axially parallel multi-camera systems as indicated with reference to FIG. 17.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Alignment aid for a camera system of cameras with exchangeable objectives comprising:
a holder with a plurality of connecting pieces, wherein the holder is implemented such that the connecting pieces or holder modules of the holder, where the connecting pieces are held rigidly or merely at rotation axes, are held rigidly with respect to one another along at least one common spatial direction,
wherein
the connecting pieces are configured to fit or clamp between a camera housing and an objective of a respective camera at a lens mount between the objective and the camera housing of the respective camera upon the objective being mounted to the respective camera by a part of the lens mount being loosely moved through an opening of the connecting pieces and being engaged with a counterpart of the lens mount so that the connecting pieces become clamped between the camera housing and the objective.

2. Alignment aid according to claim 1, wherein the holder is implemented in a rigid manner between the connecting pieces.

3. Alignment aid according to claim 1, wherein the connecting pieces are oriented symmetrically or in pairs around a rotation axis in a rotation-invariant manner to one another and/or centers of the connecting pieces are arranged in a coplanar manner.

4. Alignment aid according to claim 1, wherein the connecting pieces are identical to one another.

5. Alignment aid according to claim 1, wherein the holder comprises a modular structure of several holder modules, each comprising one or several connecting pieces differing from the other holder modules, wherein the holder modules are guided movably to one another such that each holder module maintains a position of the respective holder module during projection onto an axis running in the at least one common spatial direction.

6. Alignment aid according to claim 1, wherein the holder comprises a modular structure of several holder modules, each comprising one or several connecting pieces differing from the other holder modules, wherein the holder modules are guided movably to one another such that the holder modules move parallel, collinear and/or coplanar to one another during movement.

7. Alignment aid according to claim 1, wherein the holder comprises a base and holder modules, where the holder modules are mounted in a tilted manner via hinges, each comprising one of the connecting pieces, wherein the base is implemented such that rotation axes of the hinges are arranged rigidly to one another in the at least one common spatial direction.

8. Alignment aid according to claim 7, wherein the base is implemented such that the rotation axes of the hinges are symmetrical or rotation-invariant in pairs around a rotation axis.

9. Alignment aid according to claim 7, wherein the base is implemented in a modular manner, such that the holder modules are guided movably in a direction perpendicular to the at least one common spatial direction.

10. Alignment aid according to claim 7, wherein the holder modules are mounted on the base in a tiltable manner via the hinges such that
tiltings of all the holder modules are coupled to one another via the hinges, such that each connecting piece is equally tilted and centers of the connecting pieces remain coplanar to one another; or
tiltings of all the holder modules of a first group are coupled to one another via their hinges, and tiltings of all the holder modules of a second group are coupled to one another via the hinges, such that within each group each connecting piece is equally tilted and centers of the connecting pieces remain coplanar to one another.

11. Alignment aid for a camera system of cameras with exchangeable objectives comprising:
a holder with a plurality of connecting pieces, wherein the holder is implemented such that the connecting pieces or holder modules of the holder, where the connecting pieces are held rigidly or merely at rotation axes, are held rigidly with respect to one another along at least one common spatial direction,
wherein
the connecting pieces are objective/camera housing interface connecting pieces comprising, on a first side, a first mount member for connecting with a first counterpart of a camera housing of a respective camera and, on a second side facing oppositely to the first side, a second mount member for connecting with a second counterpart of an objective of the respective camera—wherein the first and second counterparts form a lens mount using which the objective is directly and exchangeably mountable to the respective camera.

12. Method for aligning a camera system of a plurality of cameras with exchangeable objectives, comprising
positioning an alignment aid according to claim 1, such that the plurality of connecting pieces identical to one another each comprise a connection, fitting or clamping with a camera housing or an objective of the plurality of cameras;

13. Method according to claim 12, further comprising: fixing the camera housing or the objective of the plurality of cameras; and
removing the alignment aid in a state where the camera housing or the objective of the plurality of cameras is fixed.

14. Method according to claim 12, wherein the method further comprises aligning the alignment aid and a deflection mirror arrangement with respect to one another.

15. Method according to claim 12, wherein the camera system is a mirror panoramic imaging system.

16. Method according to claim 12, wherein an alignment aid according to claim 1 is used for positioning.

17. Camera system, comprising
a plurality of cameras with exchangeable objectives;
a holder with a plurality of connecting pieces, wherein
the connecting pieces are configured to fit or clamp between a camera housing and an objective of a respective camera at a lens mount between the objective and the camera housing of the respective camera upon the objective being mounted to the respective camera by a part of the lens mount being loosely moved through an opening of the connecting pieces and being engaged with a counterpart of the lens mount so that the connecting pieces become clamped between the camera housing and the objective,
wherein the holder is implemented such that the connecting pieces or holder modules of the holder, where the connecting pieces are held rigidly or merely on rotation axes, are rigid to one another along at least one common spatial direction.

18. Camera system according to claim 17, wherein the holder corresponds to an alignment aid according to claim 1.

19. Camera system according to claim 17, further comprising a deflection mirror arrangement.

20. Camera system according to claim 19, wherein
the deflection mirror arrangement comprises a plurality of mirror segments that are tilted with respect to a common axis, such that a straight line exists for each mirror segment, which is perpendicular to a respective mirror segment, wherein the straight lines intersect in a common point along the common axis,
at least one connecting piece is allocated to each mirror segment, and
the holder and the deflection mirror arrangement are guided in a shiftable manner relative to one another along the common axis, such that during mutual shift, virtual entrance pupils of the cameras remain on a common circle around the common axis with a radius depending on the shift.

21. Camera system according to claim 17 which is a panoramic imaging system.

22. Alignment aid according to claim 11, wherein the lens mount is a C Mount, CS Mount, PL Mount, Arri Standard, Arri Bayonet, Aeton Universal, B4, BNCR, S, CA, PV or FZ connection system.

23. Camera system, comprising
a plurality of cameras with exchangeable objectives;
a holder with a plurality of connecting pieces, wherein
the connecting pieces are objective/camera housing interface connecting pieces comprising, on a first side, a first mount member for connecting with a first counterpart of a camera housing of a respective camera and, on a second side facing oppositely to the first side, a second mount member for connecting to a second counterpart of an objective of the respective camera wherein the first and second counterparts form a lens mount using which the objective is directly and exchangeably mountable to the respective camera;

wherein the holder is implemented such that the connecting pieces or holder modules of the holder, where the connecting pieces are held rigidly or merely on rotation axes, are rigid to one another along at least one common spatial direction.

24. Alignment aid according to claim 1, wherein the holder comprises a plate extending between the connecting pieces.

25. Alignment aid according to claim 11, wherein the holder comprises a plate extending between the connecting pieces.

26. Alignment aid according to claim 1, wherein the connecting pieces are configured to loosely fit or clamp between the camera housing and the objective of the respective camera at the lens mount between the objective and the camera housing of the respective camera.

27. Alignment aid according to claim 11, wherein the first mount member is configured to be reversibly connected with the first counterpart of the camera housing of a respective camera in a screw-threaded manner, a bayonet manner, or a breech-lock manner and the second mount member is configured to be reversibly connected with the second counterpart of the objective of the respective camera in a screw-threaded manner, a bayonet manner, or a breech-lock manner.

28. Alignment aid according to claim 11, wherein each of the first lens mount and the second lens mount is a C Mount, CS Mount, PL Mount, Arri Standard, Arri Bayonet, Aeton Universal, B4, BNCR, S, CA, PV or FZ connection system.

\* \* \* \* \*